(12) United States Patent  
Parameshwaran

(10) Patent No.: US 9,596,562 B2  
(45) Date of Patent: Mar. 14, 2017

(54) PORTABLE ELECTRONIC DEVICE AND METHOD OF RECORDING MOBILITY OF THE PORTABLE ELECTRONIC DEVICE

(71) Applicant: Tata Consultancy Services Limited, Mumbai (IN)

(72) Inventor: Reni Parameshwaran, Kochi (IN)

(73) Assignee: Tata Consultancy Services Limited (IN)

( * ) Notice: Subject to any disclaimer, the term of this patent is extended or adjusted under 35 U.S.C. 154(b) by 0 days.

(21) Appl. No.: 14/223,975

(22) Filed: Mar. 24, 2014

(65) Prior Publication Data

US 2015/0230048 A1 Aug. 13, 2015

(30) Foreign Application Priority Data

Feb. 7, 2014 (IN) .......................... 451/MUM/2014

(51) Int. Cl.
*H04W 4/02* (2009.01)
*G01C 19/04* (2006.01)
(Continued)

(52) U.S. Cl.
CPC .............. *H04W 4/02* (2013.01); *G01C 19/04* (2013.01); *G01S 5/02* (2013.01); *G01S 19/34* (2013.01)

(58) Field of Classification Search
CPC ... H04W 4/02; H04W 4/027; H04W 52/0254; H04W 52/028; H04W 64/00;
(Continued)

(56) References Cited

U.S. PATENT DOCUMENTS 8,024,111 B1 9/2011 Meadows et al.
8,140,359 B2 3/2012 Daniel
(Continued)

FOREIGN PATENT DOCUMENTS

EP 1537549 2/2004
EP 2306424 A1 4/2011
(Continued)

OTHER PUBLICATIONS

Moustafa Youssef, Mohamed Amir Yosef, Mohamed El-Derini "GAC: Energy-Efficient Hybrid GPS-Accelerometer-Compass GSM Localization"—arXiv:1004.3174v1 [cs.NI] Apr. 19, 2010, (6 pages).

(Continued)

*Primary Examiner* — Hirdepal Singh
(74) *Attorney, Agent, or Firm* — Finnegan, Henderson, Farabow, Garrett & Dunner, L.L.P.

(57) ABSTRACT

The present disclosure generally relates to recording movement of a portable electronic device, and more particularly, to a portable electronic device and methods for recording mobility of the portable electronic device. In one embodiment, a method for recording a mobility of a portable electronic device is disclosed, comprising detecting a movement of the portable electronic device using a first sensor; when the movement exceeds a threshold level, determining velocity, a position coordinate, and a time coordinate of the portable electronic device using a second sensor, wherein the threshold level indicates a pre-configured speed and a pre-configured time period associated with the movement; and recording one or more values corresponding to the determined velocity, the position coordinate, and the time coordinate, the one or more values representing mobility of the portable electronic device.

21 Claims, 5 Drawing Sheets

(51) Int. Cl.
*G01S 5/02* (2010.01)
*G01S 19/34* (2010.01)

(58) Field of Classification Search
CPC ... G01C 19/04; G01S 5/02; G01S 2013/9314; G01S 2013/9364; G01S 2013/9367; G01S 7/003; G01S 19/34; H04M 2250/12
See application file for complete search history.

(56) References Cited

U.S. PATENT DOCUMENTS

| | | |
|---|---|---|
| 8,271,057 B2 | 9/2012 | Levine et al. |
| 8,332,132 B2 | 12/2012 | Groenhuijzen et al. |
| 8,934,869 B2 * | 1/2015 | Edara .................. H04W 36/32 455/411 |
| 2007/0027726 A1 | 2/2007 | Warren et al. |
| 2010/0231383 A1 * | 9/2010 | Levine et al. ............... 340/540 |
| 2011/0166777 A1 | 7/2011 | Chavakula |
| 2011/0300875 A1 * | 12/2011 | Kim .................. G01S 19/16 455/456.1 |
| 2011/0307188 A1 | 12/2011 | Peng et al. |
| 2013/0314278 A1 * | 11/2013 | Lim et al. ............... 342/357.74 |
| 2015/0011249 A1 * | 1/2015 | Siliski et al. ............. 455/456.6 |
| 2015/0071090 A1 * | 3/2015 | Mohammed et al. ........ 370/252 |
| 2015/0087264 A1 * | 3/2015 | Goyal .................... G01S 19/34 455/411 |
| 2015/0105097 A1 * | 4/2015 | Sun .................... H04W 64/003 455/456.1 |
| 2015/0156647 A1 * | 6/2015 | Braun .................. H04W 24/08 455/426.1 |
| 2015/0215830 A1 * | 7/2015 | Dalsgaard ......... H04W 36/0094 455/444 |

FOREIGN PATENT DOCUMENTS

| | | |
|---|---|---|
| JP | 2002-260146 A | 9/2002 |
| WO | WO 2013/096908 A1 | 6/2013 |

OTHER PUBLICATIONS

Jeongyeup Paek, Joongheon Kim, Ramesh Govindan "Energy-Efficient Rate-Adaptive GPS-based Positioning for Smartphones"—*MobiSys'10*, 2010, San Francisco, California, USA. (16 pages).

Salas K Jose, X. Anitha Mary, Namitha Mathew "ARM 7 Based Accident Alert and Vehicle Tracking System"—International Journal of Innovative Technology and Exploring Engineering (IJITEE) ISSN: 2278-3075, vol. 2, Issue-4, Mar. 2013, (4 pages).

Chi Wang, Hua Liu, Bhaskar Krishnamachari, Murali Annavaram, Tsinghua University, Beijing, China, University of Southern California, Los Angeles, CA, USA, "A Privacy Mechanism for Mobile-based Urban Traffic Monitoring", available at http://ceng.usc.edu/assets/002/69518.pdf (14 pages).

Wunelli—Telematics Solutions for Motor Insurance, "SoteriaDrive—Delivering Safer Driving", www.wunelli.com/mobile-apps.aspx, 2013, (3 pages).

Discovery Insure, "Vitalitydrive", https://www.discovery.co.za/portal/individual/insure-vitality-drive-overview, 2014, (3 pages).

Aviva Drive, "How does Aviva Drive work?", http://www.aviva.co.uk/drive/, Dec. 2013, (3 pages).

* cited by examiner

PORTABLE ELECTRONIC DEVICE AND METHOD OF RECORDING MOBILITY OF THE PORTABLE ELECTRONIC DEVICE

PRIORITY CLAIM

This U.S. patent application claims priority under 35 U.S.C. §119 to India Provisional Patent Application No. 451/MUM/2014, filed on Feb. 7, 2014. The aforementioned application is incorporated herein by reference in its entirety.

TECHNICAL FIELD

The present disclosure generally relates to recording movement of a portable electronic device, and more particularly, to a portable electronic device and methods for recording mobility of the portable electronic device.

BACKGROUND

Many portable electronic devices, such as mobile phone, may comprise sensors to determine movement of the portable electronic devices. A variety of sensors may include accelerometer sensors, gyroscope sensors, compasses, geomagnetic sensors, Global Positioning System (GPS) sensors, etc.

An accelerometer sensor may sense a linear motion, for example, a translation in any plane, such as a local horizontal plane. The translation may be measured with reference to at least one axis. An accelerometer sensor may be used to sense an object's motion in, for example, a Cartesian coordinate space (e.g., x, y, and z). Further, the accelerometer may also be used to sense the direction of gravity to estimate an object's roll and pitch.

A global positioning system (GPS) sensor may sense information related to speed, direction of motion, and location of the portable electronic device. The GPS sensor may use signals from earth-orbiting navigation satellites to ascertain the portable electronic device's location. A global positioning system receiver in the portable electronic device may gather signals from the navigation satellites. The global positioning system circuitry may analyze the data from the receiver to calculate the current position of the portable electronic device.

Sensors, such as accelerometer sensors, micro-electromechanical systems (MEMS) sensors, gyroscopes, compasses, GPS sensors, may be used to determine the movement of the portable electronic device. To accurately determine the speed and location of the portable electronic device, one or more sensors may be used in combination to provide multi-axes measurements. However, use of one or more sensors to perform measurement may consume considerable battery life of the portable electronic device and thus may affect efficiency of the portable electronic device. For example, a GPS sensor may consume more power, when activated, as compared to other sensors in the portable electronic device. Further, the GPS sensor may continue to be activated, even when the portable electronic device is moving slowly or being stationary, resulting in consumption of more power than necessary. Current available portable electronic devices may not provide efficient use of GPS sensors to determine accurate movement and location of the portable electronic devices, when the portable electronic devices are moving slowly or being stationary.

SUMMARY

This summary is provided to introduce aspects related to systems and methods for recording a mobility of a portable electronic device, and the aspects are further described below in the detailed description. This summary is not intended to identify essential features of the claimed disclosure nor is it intended for use in determining or limiting the scope of the claimed disclosure.

Before the present portable electronic device and method, enablement are described, it is appreciated that this disclosure is not limited to the particular platforms, systems, and methodologies described, as there can be multiple possible embodiments of the present disclosure and which are not expressly illustrated in the present disclosures. It is also appreciated that the terminology used in the description is for the purpose of describing the particular versions or embodiments only, and is not intended to limit the scope of the present disclosure.

In one embodiment, a method for recording a mobility of a portable electronic device is disclosed. The method comprises detecting a movement of the portable electronic device using a first sensor; when the movement exceeds a threshold level, determining velocity, a position coordinate, and a time coordinate of the portable electronic device using a second sensor, wherein the threshold level indicates a pre-configured speed and a pre-configured time period associated with the movement; and recording one or more values corresponding to the determined velocity, the position coordinate, and the time coordinate, the one or more values representing mobility of the portable electronic device.

In one embodiment, a portable electronic device is disclosed. The portable electronic device comprises a first sensor; a second sensor; one or more processors; and a memory storing processor-executable instructions that, when executed by the one or more processors, configure the one or more processors to: detect a movement of the portable electronic device using the first sensor, when the movement of the portable electronic device exceeds a threshold level, determine velocity, a position coordinate, and a time coordinate of the portable electronic device, wherein the threshold level indicates a pre-configured speed and a pre-configured time period associated with the movement, and record one or more values corresponding to the determined velocity, the position coordinate, and the time coordinate, the one or more values indicating the determined velocity, the position coordinate, or the time coordinate at a given time.

In one embodiment, a non-transitory computer readable medium having embodied thereon computer program instructions for recording a mobility of a portable electronic device is disclosed. The computer program instructions comprises instructions for configuring a processor to perform operations comprising: detecting, by one or more hardware processors executing programmed instructions stored in a memory of the portable electronic device, a movement of the portable electronic device using a first sensor; when the movement exceeds a threshold level, determining velocity, a position coordinate, and a time coordinate of the portable electronic device using a second sensor, wherein the threshold level indicates a pre-configured speed and a pre-configured time period associated with the movement; and recording one or more values corresponding to the determined velocity, the position coordinate, and the time coordinate, the one or more values representing mobility of the portable electronic device.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

The present disclosure relates to a portable electronic device and method(s) for recording a mobility of a portable electronic device. In some embodiments, the method may include detecting movement of the portable electronic device by using a first sensor of the portable electronic device. The method may also include determining velocity, a position coordinate, and a time coordinate of the portable electronic device using a second sensor of the portable electronic device, when the movement exceeds a threshold level. The threshold level is indicative of a predefined speed rate and a predefined time period associated with the movement of the portable electronic device. The method may further include recording one or more values corresponding to the velocity, the position coordinate, and the time coordinate based on the mobility of the portable electronic device.

Further, the second sensor may be activated to record the one or more values when the movement exceeds the threshold level. The second sensor may be deactivated when the movement of the portable electronic device reduces below the threshold level. The recording of the one or more values may be terminated when the movement reduces below the threshold value to reduce the battery consumption of the portable electronic device.

While aspects of the portable electronic device and method of recording a mobility of the portable electronic device may be implemented in any number of different computing systems, environments, and/or configurations, the embodiments are described in the context of the following exemplary method and portable electronic device.

Figure 1:
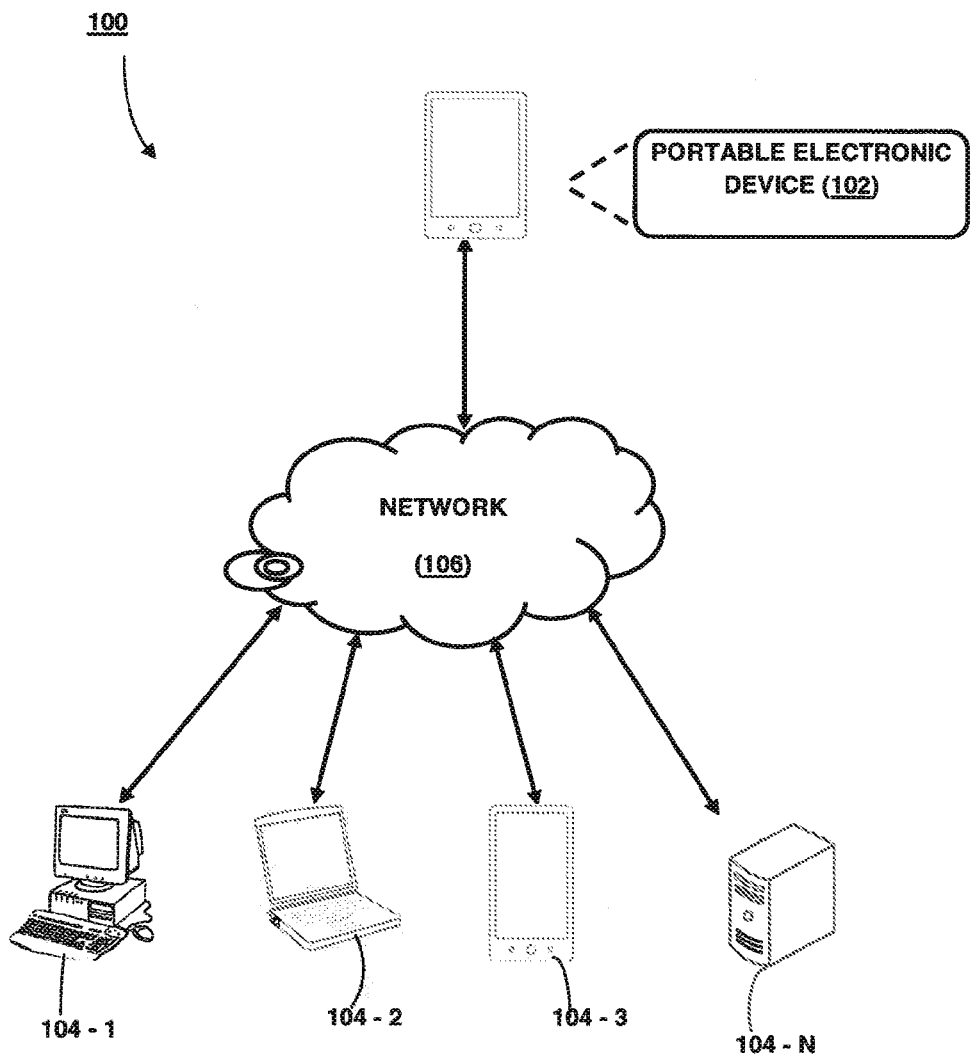
FIG. 1 illustrates an exemplary network environment including a portable electronic device, in accordance with an embodiment of the present disclosure.

FIG. 1 illustrates an exemplary network environment 100 including a portable electronic device 102 for recording mobility is illustrated, in accordance with an embodiment of the present disclosure.

Although the present disclosure is explained by considering a scenario that the portable electronic device 102 is a mobile phone implementing recording of mobility. It may be understood that the portable electronic device 102 may also be implemented as a variety of computing systems, such as a laptop computer, a desktop computer, a notebook, a cellular phone, a tablet computer, a Personal Digital Assistant (PDA) device, a smart-phone, a Portable Navigation Device (PND), a wireless device, a mobile device, a handheld device, a mobile route guidance device, a portable audio/video player, etc. It will be understood that the portable electronic device 102 may be connected to one or more user devices 104-1, 104-2, . . . 104-N, collectively referred to as user devices 104 hereinafter, or applications residing on the user devices 104. Examples of the user devices 104 may include, but are not limited to, a portable computer, a personal digital assistant, a handheld device, a tablet computer, a server, a database, an external database, a mainframe, and a workstation. The user devices 104 are communicatively coupled to the portable electronic device 102 through a network 106.

In one embodiment, the network 106 may be a wireless network, a wired network, or a combination thereof. The network 106 may be implemented as one of the different types of networks, such as intranet, local area network (LAN), wide area network (WAN), the Internet, etc. The network 106 may either be a dedicated network or a shared network. The shared network may represent an association of the different types of networks that use a variety of protocols (e.g., Hypertext Transfer Protocol (HTTP), Transmission Control Protocol/Internet Protocol (TCP/IP), Wireless Application Protocol (WAP), etc.) to communicate with one another. Further, the network 106 may include a variety of network devices, including routers, bridges, servers, computing devices, storage devices, etc.

Figure 2:
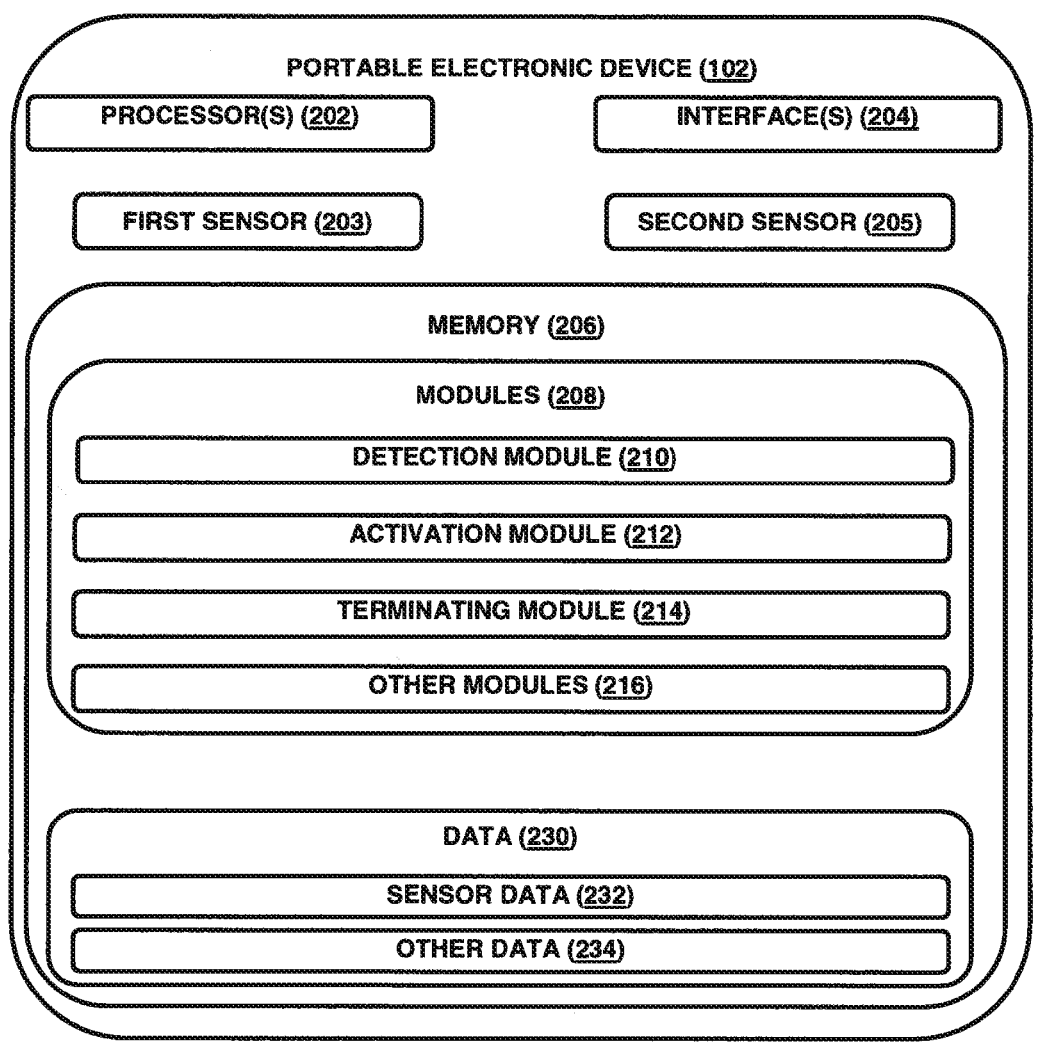
FIG. 2 illustrates an exemplary portable electronic device in accordance with an embodiment of the present disclosure.

FIG. 2 illustrates an exemplary portable electronic device 102 in accordance with an embodiment of the present disclosure. In one embodiment, the portable electronic device 102 may include at least one processor 202, an input/output (I/O) interface 204, and a memory 206. The at least one processor 202 may be implemented as one or more microprocessors, microcomputers, microcontrollers, digital signal processors, central processing units, state machines, logic circuitries, and/or any devices that manipulate signals based on operational instructions. Among other capabilities, the at least one processor 202 may be configured to fetch and execute computer-readable instructions stored in the memory 206.

The I/O interface 204 may include a variety of software and hardware interfaces, for example, a web interface, a graphical user interface, etc. The I/O interface 204 may allow the portable electronic device 102 to interact with a user. Further, the I/O interface 204 may enable the portable electronic device 102 to communicate with other computing devices, such as web servers and external data servers (not shown). The I/O interface 204 may facilitate multiple communications within a wide variety of networks and protocol types, including wired networks (e.g., LAN, cable networks, etc.) and wireless networks (e.g., WLAN, cellular networks, or satellite networks). The I/O interface 204 may include one or more ports for connecting a number of devices to one another or to another portable electronic device.

The memory 206 may include any computer-readable medium including, for example, volatile memory (e.g., static random access memory (SRAM) and dynamic random access memory (DRAM)) and/or non-volatile memory, such as read only memory (ROM), erasable programmable ROM, flash memories, hard disks, optical disks, and magnetic tapes. The memory 206 may include modules 208 and data 230.

The modules 208 include routines, programs, objects, components, data structures, etc., which perform particular tasks or implement particular abstract data types. In one embodiment, the modules 208 may include a detection module 210, an activation module 212, a terminating module 214, and other modules 216. The other modules 216 may include programs or coded instructions that supplement applications and functions of the portable electronic device 102. The data 230, among other things, may serve as a repository for storing data processed, received, and generated by one or more of the modules 208. The data 230 may also include a sensor data 232 and other data 234. The other data 234 may include data generated as a result of the execution of one or more modules in the other modules 216.

In one embodiment, referring to FIG. 2, the portable electronic device 102 may comprise a first sensor 203. The first sensor 203 may comprise at least one of an accelerometer, a gyroscope sensor, a compass, a MEMS sensor. Further, the first sensor 203 may comprise a global positioning system (GPS) sensor. The first sensor 203 may be attached to the portable electronic device 102. For example, the first sensor 203 may be attached to a motherboard of the portable electronic device 102. The portable electronic device 102 may comprise a laptop computer, a desktop computer, a notebook, a cellular phone, a tablet computer, a Personal Digital Assistant (PDA) device, a smart-phone, a Portable Navigation Device (PND), a wireless device, a mobile device, a handheld device, a mobile route guidance device, or a portable audio/video player. Alternatively, the first sensor 203 may be integrated with another component of the portable electronic device 102. For example, the first sensor 203 may be integrated with a chipset of the portable electronic device 102.

The detection module 210 may be configured to detect a movement of the portable electronic device 102 from the first sensor 203. The first sensor 203, hereinafter, may be alternatively referred to as the accelerometer sensor 203 to illustrate the embodiments. The detection module 210 may be configured to determine a threshold level. The threshold level may be indicative of a predefined speed rate and a predefined time period associated with the movement of the portable electronic device 102. For example, the predefined speed rate may be 20 miles per hour and the predefined time may be a 5-minute interval.

In one embodiment, the activation module 212 may be configured to activate a second sensor 205 when the movement of the portable electronic device 102 exceeds the threshold level. The second sensor 205 may comprise at least one of a Global Positioning System (GPS) sensor, a Wi-Fi hotspot triangulation sensor, a Wi-Fi access point sensor, or a cell tower triangulation sensor. The second sensor 205 may determine velocity, a position coordinate, and a time coordinate of the portable electronic device 102. The one or more values may be indicative of the sensor data 232. The second sensor 205, hereinafter, may be alternatively referred as the GPS sensor 205 to illustrate the embodiments. The second sensor 205 may be attached to the portable electronic device 102. For example, the second sensor 205 may be attached to the motherboard of the portable electronic device 102. Alternatively, the second sensor 205 may be integrated with another component of the portable electronic device 102. For example, the second sensor 205 may be integrated with the chipset of the portable electronic device 102.

The detection module 210 may leverage a region monitoring and a significant location monitoring to detect the movement of the user for a considerable distance. The region monitoring and the significant location monitoring may be implemented using, for example, a framework available for Apple iOS™ platform. The region monitoring may be implemented by considering the information from at least one of the Wi-Fi signal, change in cell tower signal, or a combination thereof. The significant location monitoring may be implemented by considering the information from the cell tower signal changes. When the detection module 210 detects movement of the user for a significant distance, the activation module 212 may activate the GPS sensor 205 to determine the velocity of the portable electronic device 102. The region monitoring may be implemented by, for example, defining a circle of a specified radius around a known point on the Earth's surface using the Wi-Fi signal or the cell tower.

The detection module 210 may detect movement of the portable electronic device 102 using the accelerometer sensor 203 based on a boundary crossing and motion detection. A boundary may be pre-determined for a particular region based on the location of the user. The boundary may be defined as the circle with a specific radius in a region. For example, if the accelerometer sensor 203 detects that the portable electronic device 102 is moving and has crossed the specific radius that may be pre-determined for a predefined time period, the activation module 212 may activate the GPS sensor 205.

Embodiments of the present disclosure may utilize the accelerometer sensor 203 to detect movement of the portable electronic device 102 and send a trigger to activate the GPS sensor 205. Activation of the GPS sensor 205 as-required may extend a battery life of the portable electronic device 102, by allowing the portable electronic device 102 to remain in an operating state that draws a minimal amount of power until the movement of the portable electronic device 102 reaches the threshold level. When the movement exceeds the threshold level, the portable electronic device 102 automatically transitions to the operating state, in which the portable electronic device may determine, based on the GPS sensor 205, the geographic location using the position coordinate and the time coordinate.

In some embodiments, the portable electronic device 102 may comprise the circuitry and one or more sensors for supporting a location determining capability, such as that provided by the global positioning system (GPS) or other positioning systems. For example, the one or more sensors may comprise systems using Wi-Fi access points or cellular grids. In some embodiments, a positioning system, such as a GPS receiver, may be integrated into the portable electronic device 102 or provided as a separate device that may be coupled to the portable electronic device 102 through the I/O interface 204 to provide access to location-based services.

When the activation module 212 may be fully activated, the activation module 212 may verify the movement using the GPS sensor 205. Further, the activation module 212 may then check the GPS sensor 205 to determine the mobility of portable electronic device 102 for the predefined time period (e.g., three minutes or more). If the activation module 212 detects that the movement is below the threshold level, the terminating module 214 may deactivate the GPS sensor 205. In one embodiment, the user of portable electronic device 102 may be prompted to determine whether or not to terminate the terminating module 214.

In one embodiment, the activation module 212 may be configured to record one or more values corresponding to the velocity, the position coordinate, and the time coordinate based on the GPS sensor 205. The one or more values may be indicative of determining the velocity, the position coordinate, or the time coordinate at a given time. The one or more values may include, but not limited to, values related to speed, acceleration, deceleration, cornering speed, location, and direction of the movement. The one or more values may be determined by the GPS sensor 205. Alternatively, the accelerometer sensor 203 associated with the portable electronic device 102 may determine the one or more values. In one exemplary embodiment, the activation module 212 may record the one or more values associated with movement of the portable electronic device 102 when the movement exceeds the threshold level. The terminating module 214 may terminate the recording of the one or more values of the portable electronic device 102 after deactivating the GPS sensor 205.

When the accelerometer sensor 203 detects the movement of the portable electronic device 102, the threshold level may be determined to verify the movement. In one embodiment, when the accelerometer sensor 203 detects the movement for at least two times in two minutes, the GPS sensor 205 listening may be activated. In one embodiment, the movement may be detected using the Wi-Fi access point sensor or cell tower signal change sensor. In one exemplary embodiment, when the movement is detected using the Wi-Fi access point sensor or the cell tower signal change sensor, the threshold level may not be determined for activating the GPS sensor 205.

When the activation module 212 activates the GPS sensor 205, the GPS sensor 205 may wait for the movement to reach the predefined speed rate and predefined time period. For example, the GPS sensor 205 may wait for the movement to reach up to 20 miles per hour (mph) for a period of 2-minute interval. In one exemplary embodiment, if the movement is less than 5 mph for 5 minutes, the terminating module 214 may deactivate the GPS sensor 205. When the GPS sensor 205 is deactivated, the accelerometer sensor 203 may continue to detect the movement of the portable electronic device 102.

Further, if the movement of the portable electronic device 102 increases up to at least 5 mph within 5-minute interval, the GPS sensor 205 may be activated for another 10 minute by the activation module 212. Further, the terminating module 214 may terminate the recording of the one or more values if the GPS sensor 205 determines the velocity to be less than 5 mph for more than 5 minutes and the accelerometer sensor 203 determines that the movement is due to other activities performed by the user, such as walking.

In one exemplary embodiment, the activation module 212 may activate a Cell-ID based navigation (not shown) instead of the GPS sensor 205. For example, the Cell-ID based navigation may be activated to reduce battery life consumption and/or may be activated when the battery power level of the portable electronic device 102 is below a pre-defined (or configurable) value (e.g., below 20 percent of full capacity). In one exemplary embodiment, the activation module 212 may activate the GPS sensor 205 when the power level of the battery is more than 25 percent.

In one embodiment, if the power level in the battery falls below a certain percentage, the terminating module 214 may terminate the recording of the one or more values and may deactivate the accelerometer sensor 203, the GPS sensor 205, or both. Further, the GPS sensor 205 listening may be terminated and the polling frequency of accelerometer sensor 203 may be reduced to conserve battery. Further, in case of the region monitoring to detect the movement, if the battery level is below 25 percent, the radius of the region to be monitored may be increased. For example, the region to be monitored may be increased from radius of 100 meters to 1 km.

In one exemplary embodiment, if the detection module 210 determines that the movement of the portable electronic device 102 is more than 20 miles per hour, for a period of 20 minutes constantly, the activation module 212 may reduce the GPS sensor 205's polling interval. The reduction in polling interval of the GPS sensor 205 may reduce the battery consumption of the portable electronic device 102.

The activation of the GPS sensor 205 when the movement exceeds the threshold may facilitate to avoid the recording of the one or more values when the portable electronic device 102 is stationary. The modules 208 may enable the recording of the one or more values when the movement of the portable electronic device 102 is above the threshold level. The portable electronic device 102 may create a new record for a trip as may be defined by the user. For example, the portable electronic device 102 may create the trip to record the movement between the user's predefined locations. In one exemplary embodiment, the user may terminate the recording of the one or more values associated with the movement. Further, the terminating module 214 may terminate the recording of the one or more values when the portable electronic device 102 becomes stationary for a given period of time as may be defined by the user. The terminating module 214 may terminate the recording of the one or more values based on the GPS sensor 205.

The activation module 212 may determine the GPS sensor 205's accuracy. For example, the one or more values below 20 meters horizontal accuracy may be considered to be error free and may be used for event detection. In case of zero value is received from the GPS sensor 205, the activation module 212 may verify the accuracy of the one or more values associated with the movement (speed) by comparing with a calculated speed. In case of a significant variance, the GPS signal may not be considered for event detection.

In some embodiments, when the activation module 212 receives the speed values from the GPS sensor 205 as zero or negative, the activation module 212 may calculate the velocity based on the distance and the time between two GPS location coordinates. The calculated speed may be used to compare with the threshold level of velocity for recording the one or more values associated with the trip. As a result, it may be determined as to whether the portable electronic device 102 has crossed the threshold level (e.g., 20 mph) to initiate the recording of the one or more values for the trip. The calculated speed values may not be used for event detection, for example, for calculating braking or acceleration events of the portable electronic device 102.

Further, if the GPS sensor 205 determines that, when the activation module 212 records the one or more values, quality GPS signal is not received with less than or equal to 20 meters based on the horizontal accuracy, the terminating module 214 may terminate the recording of the one or more values. Further, if the user changes or configures the time of the portable electronic device 102 at the time of recording of the one or more values by the activation module 212, the terminating module 214 may terminate the recording of the one or more values.

Further, the event detection logic may not use Kalman filtered location coordinates for determining map of the location. If the activation module 212 receives multiple GPS signals in a time interval of a second, a more accurate GPS signal based on horizontal accuracy may be considered. Further, if multiple GPS signals with the same accuracy values are present, the latest GPS signal may be considered.

In one embodiment, the one or more values provided by the GPS sensor 205 may be considered to be error free when the one or more values comprises more than 3 satellite counts. Further, when zero value is received from the GPS sensor 205, the activation module 212 may verify the accuracy by comparing with the calculated speed. In case of a significant variance, the GPS signal may not be considered for the event detection.

Determining the accuracy and the event detection may be implemented in an operating system platform including, for example, Apple iOS™, Google Android™, Microsoft Windows™, Windows Phone, Windows RT, Blackberry™, Palm OS™, Tizen™, HP web OS, Bada, Symbian, Firefox OS, or any operating system platform. Determining the accuracy and the event detection in other than the operating system platforms described herein may be obvious to one of ordinary skill in the art.

In one embodiment, the one or more values may be collected from the accelerometer sensor 203. The accelerometer sensor 203 may determine axis (e.g., x, y, and z) values and the axis values may be collected if the movement exceeds the threshold level. A sampling frequency may be set as 20 Hz. Further, a high pass filter with cut off frequency 0.7 Hz may be applied to remove contribution from the force of gravity and to reduce noise.

In some embodiments, one event may be recorded to filter multiple events. For example, the movement exceeding the threshold level may be recorded for 10 seconds. If there are multiple events within 10 seconds, the event with maximum intensity may be recorded. If the horizontal accuracy values vary significantly, for example, more than 20 meters between two GPS signals considered for the event detection, the event may not be recorded. In some embodiments, the GPS sensor 205 based events may be considered to comprise more priority than the accelerometer sensor 203 based events. For example, if similar events are triggered from the GPS sensor 205 and the accelerometer sensor 203 in a time interval of 10 seconds, the GPS sensor 205 events may be considered. The accelerometer sensor 203 based events may be considered if the post-event movement is above 5 miles per hour. The events, such as a braking event, may be considered if the movement that is 3 seconds before the detection of the event is above 5 miles per hour.

In one embodiment, the portable electronic device 102 may comprise the operation state for recording the mobility of the portable electronic device 102. The operation state may comprise an all-trip mode, an in-vehicle mode, and a location-based mode. The operation state of the portable electronic device 102 to record the mobility is further described in detail below. In one exemplary embodiment, the operation mode may comprise a driving mode, indicating that the state of the portable electronic device 102 is "moving."

Figure 3:
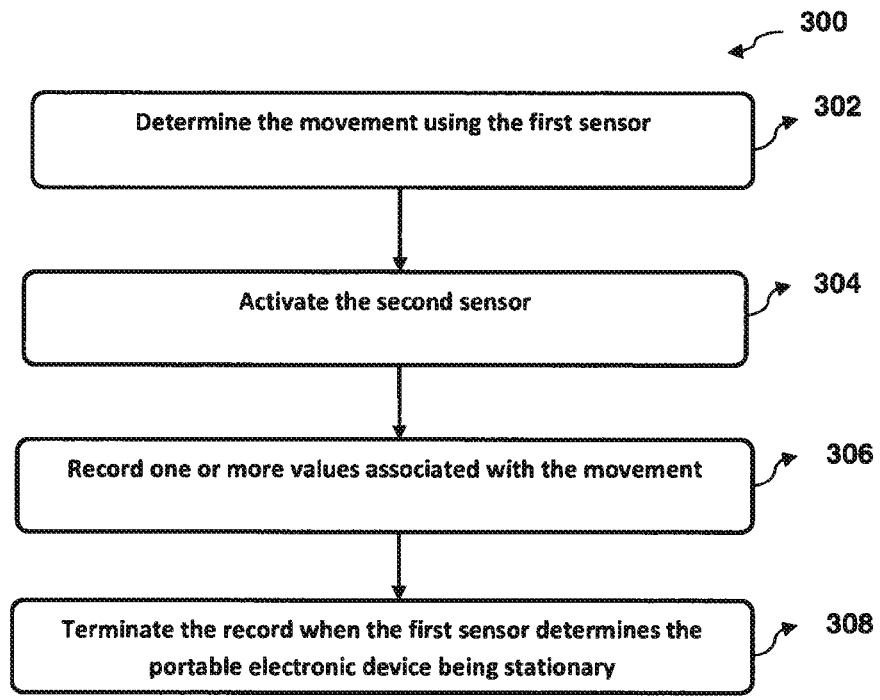
FIG. 3 illustrates an exemplary method of recording the mobility of the portable electronic device in an all-trip mode, in accordance with an embodiment of the present disclosure.

In one embodiment, FIG. 3 illustrates an exemplary method 300 for recording the mobility of the portable electronic device 102 in the all-trip mode. The order in which the method 300 is described is not intended to be construed as a limitation, and any number of the described steps can be combined in any order to implement the method 300 or alternate methods. Additionally, individual steps may be deleted from the method 300 without departing from the spirit and scope of the disclosure described herein.

As shown at step 302, in the all-trip mode, the first sensor 203 may detect the movement. The activation module 212 may activate the second sensor 205 when the movement of the portable electronic device 102 exceeds the threshold level, as shown at step 304. Further, the activation module 212 may record one or more values associated with the movement, as shown at step 306. Further, the terminating module 214 may terminate the recording of the movement when the first sensor 203 determines that the portable electronic device 102 may be stationary, as shown at step 308. In one exemplary embodiment, the second sensor 205 may determine that the portable electronic device 102 is being stationary.

Figure 4:
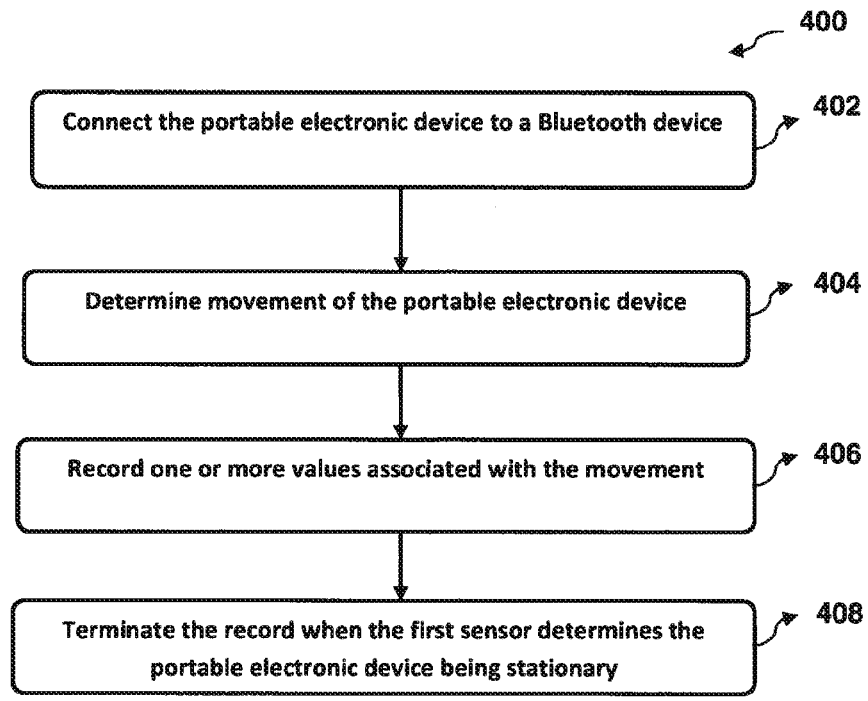
FIG. 4 illustrates an exemplary method of recording the mobility of the portable electronic device in an in-vehicle mode, in accordance with an embodiment of the present disclosure.

In one embodiment, FIG. 4 illustrates an exemplary method 400 for recording the mobility of the portable electronic device 102 in the in-vehicle mode. The order in which the method 400 is described is not intended to be construed as a limitation, and any number of the described steps can be combined in any order to implement the method 400 or alternate methods.

In one embodiment, the in-vehicle mode may facilitate the user to select a Bluetooth device (not shown). The in-vehicle mode may be implemented when the portable electronic device 102 is in a vehicle. The Bluetooth device of the vehicle may be connected or paired to the portable electronic device 102 using one of the protocols disclosed above or any other communication protocols. In one exemplary embodiment, the portable electronic device 102 may be connected to an on-board system of the vehicle. Further, the portable electronic device 102 may be connected to the on-board system of the vehicle using a Wi-Fi signal associated with a Wi-Fi router in the vehicle, as shown at step 402.

In one exemplary embodiment, the first sensor 203 may determine the movement of the portable electronic device 102. Further, the movement of the portable electronic device 102 may be determined by the one or more sensors associated with the vehicle, as shown at step 404. In some embodiments, the activation module 212 may record the movement of the portable electronic device 102 when the first sensor 203 or the one or more sensors associated with the vehicle detects the movement, as shown at step 406.

For example, the operating state of the portable electronic device 102 may be changed to the driving mode when the accelerometer sensor 203 detects the movement. Further, the activation module 212 may activate the GPS sensor 205 to record the one or more values associated with mobility of the portable electronic device 102. In one exemplary embodiment, in the in-vehicle mode, the one or more values may be recorded without determining the threshold value. Further, the terminating module 214 may terminate the recording of the movement when the accelerometer sensor 203 determines that the portable electronic device 102 may be stationary, as shown at step 408.

In the in-vehicle mode, the activation module 212 may activate the GPS sensor 205 when the accelerometer sensor 203 detects the movement of the portable electronic device 102 and the portable electronic device 102 is connected to the Bluetooth device of the vehicle. Further, the terminating module 214 may terminate the recording of the one or more values associated with the mobility when the connection between the Bluetooth device of the vehicle and the portable electronic device 102 may be lost for a predetermined period, for example, for a period of 5 minutes.

In one embodiment, the portable electronic device 102 may use the location information to identify the current location of the portable electronic device 102 even when the portable electronic device 102 is unable to identify its current location. For example, due to the failure of the GPS sensor 205 to determine the location, or failure of the GPS sensor 205 to acquire GPS signals or other location signals from IEEE 802.x, Bluetooth™ transmitters, etc. Additionally or alternatively, the portable electronic device 102 may use the location information provided by the one or more sensors associated with the vehicle, instead of the GPS sensor 205, to determine location of the portable electronic device 102.

Figure 5:
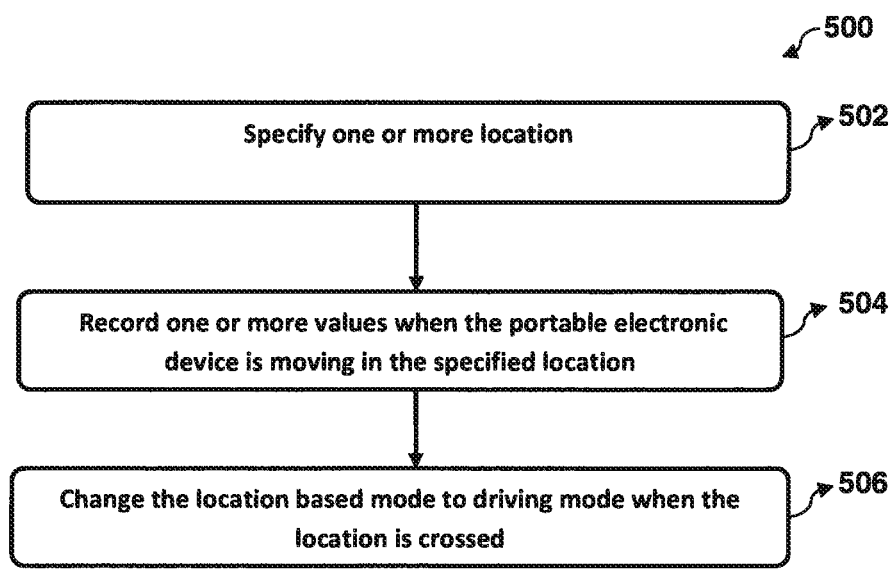
FIG. 5 illustrates an exemplary method of recording the mobility of the portable electronic device in a location-based mode, in accordance with an embodiment of the present disclosure.

In one embodiment, FIG. 5 illustrates an exemplary method 500 for recording the mobility of the portable electronic device 102 in the location-based mode. The order in which the method 500 is described is not intended to be construed as a limitation, and any number of the described steps can be combined in any order to implement the method 500 or alternate methods.

In the location-based mode, the user may specify one or more locations to initiate the activation module 212, as shown at step 502. The activation module 212 may record the one or more values associated with the movement of the portable electronic device 102, as shown at step 504. For example, the user may specify up to 5 locations to record the movement of the one or more values. The activation module 212 may detect if the user crosses the specified location. If the user crosses the specified location, the activation module 212 may change the operating state to the driving mode, as shown at step 506.

When the operating state is changed to the driving mode, the activation module 212 may be implemented in a manner similar to that of the all trip mode. In one exemplary embodiment, the accelerometer sensor 203 may determine the location crossing of the portable electronic device 102. Further, the activation module 212 may activate the GPS sensor 205 when the movement exceeds the threshold level. For example, the activation module 212 may activate the GPS sensor 205 when the movement exceeds 20 mph for a 20-minute interval, after the accelerometer sensor 203 determines that the portable electronic device 102 has crossed the specified location.

In one embodiment, when the movement of the portable electronic device 102 exceeds the threshold value instantaneously, the activation module 212 may provide an alert to the user indicating the sudden increase in the movement. Further, the activation module 212 may provide an audio alert to the user.

In one embodiment, the one or more values may be stored in the memory 206 of the portable electronic device 102. In one embodiment, the one or more values may be transmitted to an external database using a transmission module (not shown). The one or more values may be transmitted using one or more wireless communication subsystems. The one or more wireless subsystems may include, but not limited to, one or more networks operating in accordance with IEEE 802.11, 802.11a, 802.11b, 802.11g, 802.11n, 802.16, 802.16d, 802.16e, 802.16m standard communication protocols, and/or a Bluetooth™ communication protocol. Other communication protocols may also be used for transmission, including 802.x communication protocols, for example, Wi-Max, Wi-Fi, code division multiple access (CDMA), global system for mobile communications (GSM), Enhanced Data GSM Environment (EDGE), 2G, 2.5G, 3G, Third Generation Partnership Project (3GPP), 3GPP Long Term Evolution (LTE), 3.5G, 4G, etc.

Although portions of the disclosure herein relate to wired links, wired port connection, and/or wired communications, some of the embodiments may not be limited to a specific embodiment, and may include one or more wired or wireless links, may utilize one or more components of wireless communication subsystems, and may utilize one or more methods or protocols of wireless communication.

In some embodiments, a port device (not shown), such as a Universal Serial Bus (USB) port, a docking port, or other wired port, may be used. The port device may be used to establish the wired connection to other computing devices, such as the user devices 104, for receiving and/or transmitting the sensor data 232. In one exemplary embodiment, the port device may allow the portable electronic device 102 to synchronize with the user devices 104 using one or more protocols, such as the TCP/IP, HTTP, UDP, and other protocols that may be obvious to one of ordinary skill in the art.

The portable electronic device 102 may receive navigation information based on the position coordinate and the time coordinate. For example, the position coordinate corresponding to the location of the portable electronic device 102 may be transmitted to the user devices 104. The transmission module may transmit the position coordinate. The user devices 104 may comprise the database that includes the navigation information.

The portable electronic device 102 may transmit the one or more values associated with the record of the movement to the user devices 104. The one or more values may be transmitted in a compressed format. The one or more values may be transmitted using any one of the one or more wireless communication subsystems. Further, when the one or more values is recorded at the time when the portable electronic device 102 is not connected to the one or more wireless communication subsystems, the one or more values may be uploaded when the portable electronic device 102 is connected to the network 106. If the one or more values associated with a given trip are not uploaded to the user devices 104, the one or more values associated with the given trip may be uploaded with a subsequent trip in the compressed format.

The navigation information may comprise route information, traffic information along a particular route, weather information for a given location at a given time, etc. The navigation information may be collected from the other user devices 104. The portable electronic device 102 may receive navigation information based on the mobility to move in a particular route. Further, the portable electronic device 102 may receive navigation information corresponding to a map of the location. The portable electronic device 102 may retrieve the navigation information from the user devices 104 related to the route. In one exemplary embodiment, the navigation information may include, but not limited to, applicable speed limits, driving laws, road signs, traffic conditions, or whether any accidents have occurred along the route. The navigation information that includes alerts and the map may be displayed on the I/O interface 204, such as on the display of the portable electronic device 102.

Figure 6:
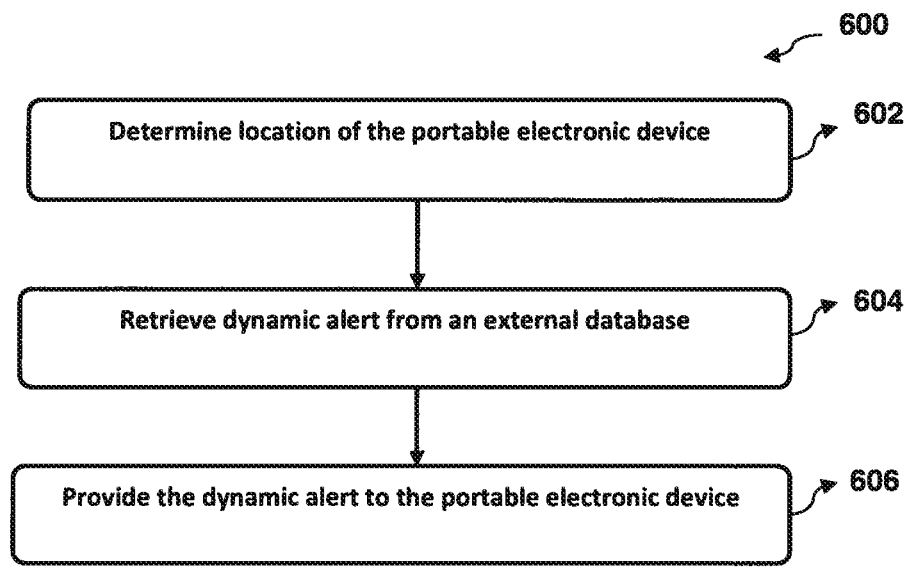
FIG. 6 illustrates an exemplary method for providing dynamic alert to a portable electronic device, in accordance with an embodiment of the present disclosure.

In one embodiment, FIG. 6 illustrates an exemplary method 600 for providing a dynamic alert to the portable electronic device 102. The order in which the method 600 is described is not intended to be construed as a limitation, and any number of the described steps can be combined in any order to implement the method 600 or alternate methods.

At step 602, the location of the portable electronic device 102 may be determined using the GPS sensor 205. In one embodiment, the portable electronic device 102 may receive the dynamic alert based on the position coordinate and the time coordinate of the portable electronic device 102. The dynamic alert may be retrieved from the external database or the user devices 104, as shown at step 604. The dynamic alert may comprise a weather alert, a traffic alert, and an incident information alert, or a combination thereof. The portable electronic device 102 may provide the alerts received as a voice based alerts to the user, as shown at step 606.

If the portable electronic device 102 changes the route to a new route, the portable electronic device 102 may receive the navigation information based on the new route. The portable electronic device 102 may receive the dynamic alert based on the location, the direction of the movement, and the current speed of the portable electronic device 102. The portable electronic device 102 may receive risk assessment information from the user devices 104. For example, the portable electronic device 102 may receive the risk assessment information based on the current location. The risk assessment information may be received from one or more public source database or the user devices 104.

The risk assessment information may comprise severity of the risk associated with a particular route based on the location of the portable electronic device 102. The portable electronic device 102 may receive one or more suggestions from the user devices 104. The one or more suggestions may comprise speed limits, traffic congestion, and an alternate route based on the current location of the portable electronic device 102.

The risk assessment information may be received from other portable electronic devices that are in proximity to the location of the portable electronic device 102. The risk assessment information may include, but not limited to, the suggestions based on severity of conditions that are based on the location. The suggestions may be received from the user devices 104. The suggestions received may be presented to the user as a voice based suggestions. Further, the suggestions may include alerts of similar events, based on severity and/or re-occurrence of such event. In one embodiment, the suggestions may be stored in the memory 206 of the portable electronic device 102. Further, the alerts that are based on the severity may be stored in the memory 206. Further, if the user crosses the location upon receiving the suggestion, which may include a warning, the activation module 212 may also record such an event. The warning may be presented as an audio alert and the warning may be stored in the memory 206.

If the movement of the portable electronic device 102 is above the threshold level for a long period of time, the portable electronic device 102 may be presented with an alert to the user. The alert may comprise a warning or a suggestion to reduce the speed to below the threshold level or to stop the movement of the portable electronic device 102. The alert may cause the portable electronic device 102 to provide a notice to the user, for example, by ringing, or vibrating. Further, the alert may be presented as a means to notify the user to any event associated with the portable electronic device 102.

In one embodiment, the accelerometer sensor 203 may determine a deceleration in the movement of the portable electronic device 102. In one exemplary embodiment, the GPS sensor 205 may determine the deceleration in the movement of the portable electronic device 102. If the deceleration occurs in a sudden manner, for example, the movement of the portable electronic device 102 may become stationary abruptly; the sudden deceleration may indicate an occurrence of an event. The event may be an accident. Upon determining the deceleration of the movement, the portable electronic device 102 may initiate a message to other users to notify the occurrence of the event.

The user may predetermine the other users that are to be notified in case of the occurrence of the event, after sudden decrease in movement is determined. In one embodiment, the accelerometer sensor 203 may determine the deceleration or swerve (directional change) event of high value (e.g., large deceleration or large direction change), indicating the occurrence of the event. Upon detecting such event, the portable electronic device 102 may automatically send an e-mail message or SMS to an emergency response number with the location and time details of the portable electronic device 102 and the event. For example, the user of the portable electronic device 102 may configure one or more phone numbers to dial in case of detecting the occurrence of the event and may also establish a dialing order priority for the numbers. The user may also pre-configure whether to send an e-mail or SMS message instead of dialing a phone number.

The portable electronic device 102 may initiate the dialing the one or more phone numbers configured automatically, after a predetermined time interval after detecting the occurrence of the event. In one embodiment, the user may terminate the dialing when the detection may have occurred falsely. Further, the portable electronic device 102 may generate an alarm before initiating the dialing. The portable electronic device 102 may request the user to respond to the alarm before initiating the dialing or sending the message. If the user does not respond to the alarm, the portable electronic device 102 may transmit the message to the external database. The portable electronic device 102 may generate the SMS message that includes the location, an instance of occurrence of the event, and the sensor data 232 of the portable electronic device 102. The SMS message may be transmitted to the one or more phone numbers configured by the user or to an insurance company.

Figure 7:
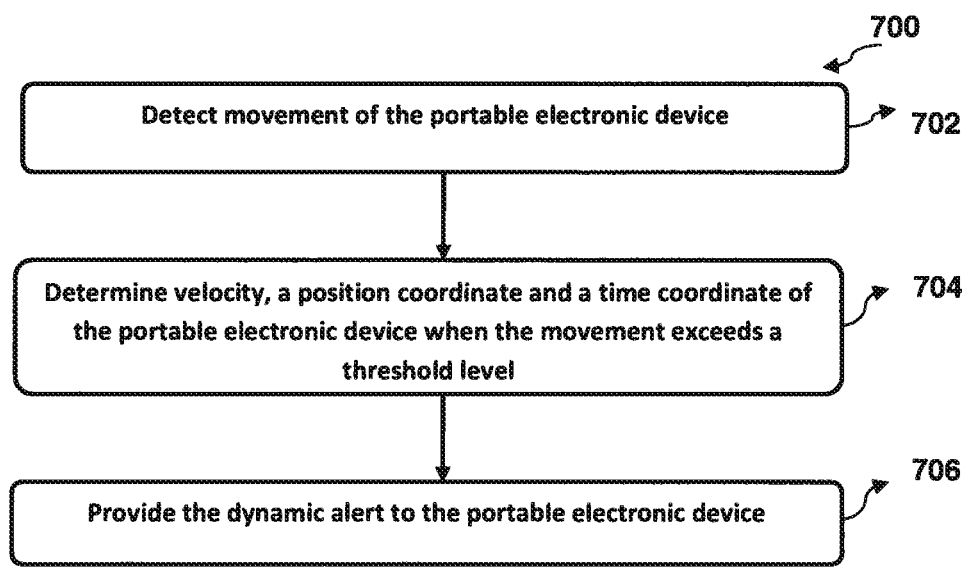
FIG. 7 illustrates an exemplary method of recording a mobility of a portable electronic device, in accordance with an embodiment of the present disclosure.

FIG. 7 illustrates an exemplary method 700 of recording a mobility of a portable electronic device 102, in accordance with an embodiment of the present disclosure. The method 700 may be described in the general context of computer executable instructions. Generally, computer executable instructions may include routines, programs, objects, components, data structures, procedures, modules, functions, etc., that perform particular functions or implement particular abstract data types. The method 700 may also be practiced in a distributed computing environment where functions are performed by remote processing devices that are linked through a communications network. In a distributed computing environment, computer executable instructions may be located in both local and remote computer storage media, including, for example, memory storage devices.

The order in which the method 700 is described and is not intended to be construed as a limitation, and any number of the described steps can be combined in any order to implement the method 700 or alternate methods. Additionally, individual blocks may be deleted from the method 700 without departing from the spirit and scope of the disclosure described herein. Furthermore, the method can be implemented in any suitable hardware, software, firmware, or combination thereof. However, for ease of explanation, in the embodiments described below, the method 700 may be considered to be implemented in the above-described portable electronic device 102.

At step 702, a movement of the portable electronic device 102 may be detected using the first sensor 203. The detection module 210 may detect the movement of the portable electronic device 102 from the first sensor 203.

At step 704, velocity, a position coordinate, and a time coordinate of the portable electronic device 102 may be determined using the second sensor 205. The velocity, the position coordinate and the time coordinate may be determined when the movement exceeds a threshold level. Threshold level may be indicative of a predefined speed rate and a predefined time period associated with the movement. The detection module 210 may be configured to determine the threshold level.

At step 706, one or more values corresponding to the velocity, the position coordinate, and the time coordinate based on the mobility may be recorded. The activation module 212 may be activated to record the one or more values when the movement of the portable electronic device 102 exceeds the threshold level. The one or more values may be indicative of determining the velocity, the position coordinate, or the time coordinate at a given time. The one or more values may include, but not limited to, values related to speed, acceleration, deceleration, cornering speed, location, and direction of the movement, determined by the GPS sensor 205.

The method 700 may further comprise deactivating the second sensor 205 when the movement of the portable electronic device 102 reduces below the threshold level. The terminating module 214 may perform the deactivating of the second sensor 205. Further, the method 700 may comprise terminating the recording of the one or more values when the movement reduces below the threshold value. The terminating module 214 may terminate the recording of the one or more values when the movement reduces below the threshold value. The transmission module may transmit the one or more values stored to the user devices 104. The transmission module may activate a network connection to transmit the one or more values to the user devices.

The portable electronic device 102 described herein may be used as a telematics device. The user may use the portable electronic device 102 when driving the vehicle. When the vehicle moves, the portable electronic device 102 may determine one or more values associated with the GPS sensor 205 to determine the vehicle speed or vehicle movement. The one or more values may be compared with the speed limit for a particular area. The alerts may be provided to the user in case the user may be moving at a speed greater than the speed limit.

In case of an accident, the accelerometer sensor 203 may detect a sudden change in g-forces, and the portable electronic device 102 may initiate a message indicating the accident. Insurer may calculate the insurance of the user based on the one or more values associated with recording movement of the portable electronic device 102.

Although implementations of portable electronic device and method for recording a mobility of a portable electronic device have been described in language specific to structural features and/or methods, it is appreciated that the appended claims are not necessarily limited to the specific features or methods described. Rather, the specific features and methods are disclosed as examples of implementations of portable electronic device and method for recording a mobility of a portable electronic device.

I claim:

1. A method for recording a mobility of a portable electronic device, comprising:
    detecting, by one or more hardware processors executing programmed instructions stored in a memory of the portable electronic device, a movement of the portable electronic device using a first sensor;
    determining velocity, a position coordinate, and a time coordinate of the portable electronic device using a second sensor and modifying polling interval or sensing region of at least one of the first sensor and the second sensor, based on the movement exceeding a threshold level, wherein the threshold level indicates a speed and a time period associated with the movement and wherein the threshold level is dynamically changed based on the detected movement from the first sensor and the determined velocity, position coordinate, and time coordinate from the second sensor in a predetermined duration; and
    recording one or more values corresponding to the determined velocity, the position coordinate, and the time coordinate, the one or more values representing mobility of the portable electronic device.

2. The method of claim 1, further comprising activating the second sensor to record the one or more values corresponding to the velocity, the position coordinate, and the time coordinate, when the movement exceeds the threshold level.

3. The method of claim 1, further comprising deactivating the second sensor when the movement of the portable electronic device reduces below the threshold level.

4. The method of claim 1, further comprising terminating the recording of the one or more values when the movement reduces below the threshold value.

5. The method of claim 1, further comprising storing the one or more values in the memory of the portable electronic device.

6. The method of claim 1, further comprising transmitting the one or more values to an external database.

7. The method of claim 1, wherein the portable electronic device comprises at least one of a cellular phone, a mobile phone, a tablet computer, a Personal Digital Assistant (PDA) device, a smart-phone, a Portable Navigation Device (PND), a mobile route guidance device, or a portable audio/video player.

8. The method of claim 1, wherein the first sensor comprises at least one of an accelerometer, a gyroscope, a compass, or a Micro-Electro-Mechanical System (MEMS) sensor.

9. The method of claim 1, wherein the second sensor comprises at least one of a Global Positioning System (GPS) sensor, a Wi-Fi access point sensor, or a cell tower triangulation sensor.

10. The method of claim 1, further comprising receiving navigation information based on the position coordinate and the time coordinate of the portable electronic device.

11. The method of claim 1, further comprising receiving at least one of a dynamic alert based on the position coordinate and the time coordinate of the portable electronic device and risk assessment information based on the current location.

12. The method of claim 11, wherein the dynamic alert comprises at least one of a weather alert, a traffic alert, and an incident information alert.

13. The method of claim 1, further comprising determining a deceleration in the movement of the portable electronic device.

14. The method of claim 13, further comprising initiating a message indicating the deceleration.

15. A portable electronic device, the portable electronic device comprising:
    a first sensor;
    a second sensor;
    one or more processors; and
    a memory storing processor-executable instructions that, when executed by the one or more processors, configure the one or more processors to:
        detect a movement of the portable electronic device using the first sensor;
        determining velocity, a position coordinate, and a time coordinate of the portable electronic device using a second sensor and modifying polling interval or sensing region of at least one of the first sensor and the second sensor, based on the movement exceeding a threshold level, wherein the threshold level indicates a speed and a time period associated with the movement and wherein the threshold level is dynamically changed based on the detected movement from the first sensor and the determined velocity, position coordinate, and time coordinate from the second sensor in a pre-determined duration; and recording one or more values corresponding to the determined velocity, the position coordinate, and the time coordinate, the one or more values representing mobility of the portable electronic device.

16. The portable electronic device of claim 15, wherein the one or more processors is further configured to transmit the one or more values to an external database or store the one or more values in the memory of the portable electronic device.

17. The portable electronic device of claim 15, wherein the portable electronic device comprises at least one of a cellular phone, a mobile phone, a tablet computer, a Personal Digital Assistant (PDA) device, a smart-phone, a Portable Navigation Device (PND), a mobile route guidance device, or a portable audio/video player.

18. The portable electronic device of claim 15, wherein the first sensor comprises at least one of an accelerometer, a gyroscope, a compass, or a Micro-Electro-Mechanical System (MEMS) sensor.

19. The portable electronic device of claim 15, wherein the second sensor comprises at least one of a Global Positioning System (GPS) sensor, a Wi-Fi access point sensor, or a cell tower triangulation sensor.

20. The portable electronic device of claim 15, wherein the one or more processors is further configured to perform at least one of:

deactivate the second sensor when the movement of the portable electronic device reduces below the threshold level; and terminate the recording of the one or more values of the portable electronic device after deactivating the second sensor.

21. A non-transitory computer readable medium having embodied thereon computer program instructions for recording a mobility of a portable electronic device, the computer program instructions comprising instructions for configuring a processor to perform operations comprising:

detecting, by one or more hardware processors executing programmed instructions stored in a memory of the portable electronic device, a movement of the portable electronic device using a first sensor;

determining velocity, a position coordinate, and a time coordinate of the portable electronic device using a second sensor and modifying polling interval or sensing region of at least one of the first sensor and the second sensor, based on the movement exceeding a threshold level, wherein the threshold level indicates a speed and a time period associated with the movement; and recording one or more values corresponding to the determined velocity, the position coordinate, and the time coordinate, the one or more values representing mobility of the portable electronic device.

* * * * *